United States Patent [19]

Lim et al.

[11] Patent Number: 4,948,846
[45] Date of Patent: Aug. 14, 1990

[54] INVERSION POLYMERIZATION OF VINYLCHLORIDE IN A REACTOR COATED WITH AN AGENT COMPRISING A CLAY AND A WATER-SOLUBLE SUSPENDING AGENT

[75] Inventors: Sam K. Lim; Jae G. Kim, both of Sungnam, Rep. of Korea

[73] Assignee: Korea Steel Chemical Co., Ltd., Seoul, Rep. of Korea

[21] Appl. No.: 292,884

[22] Filed: Jan. 3, 1989

[51] Int. Cl.$^5$ .............................................. C08F 2/20
[52] U.S. Cl. ...................................... 526/62; 526/74
[58] Field of Search ........................................... 526/62

[56] References Cited

U.S. PATENT DOCUMENTS

| | | | |
|---|---|---|---|
| 4,258,157 | 3/1981 | Hong | 526/62 |
| 4,708,890 | 11/1987 | Shimizu | 526/62 |
| 4,724,126 | 2/1988 | Dinbergs | 526/62 |

*Primary Examiner*—Christopher Henderson
*Attorney, Agent, or Firm*—Oltsch, Knoblock & Hall

[57] ABSTRACT

The polymer buildup problem that may occur in the reactor where the inversion polymerization of vinylchloride is conducted can be effectively ameliorated by way of coating the internal surfaces of the reactor with a mixture comprising an expanding lattice clay, e.g., veegum, and a water-soluble suspending agent, e.g., polyacrylic acid.

13 Claims, No Drawings

INVERSION POLYMERIZATION OF VINYLCHLORIDE IN A REACTOR COATED WITH AN AGENT COMPRISING A CLAY AND A WATER-SOLUBLE SUSPENDING AGENT

BACKGROUND OF THE INVENTION

1. Field of the Invention

This invention pertains to a process for the inversion polymerization of vinylchloride; and, more specifically, is directed to said polymerization process conducted in a reactor whose internal surfaces are treated with a single coating agent comprising a clay and a water-soluble suspending agent.

2. Description of the Prior Art

As described in, e.g., British Patent No. 748,727, an inversion polymerization comprises two processes: the initial polymerization process for the conversion of the vinylchloride monomer, e.g., to about 20% by mass in the oil phase, the monomer being the continuum; and the second polymerization process for further conversion of the monomer, e.g., up to 95% by mass in the aqueous phase, water being the continuum. The phase inversion occurs as a result of adding a sufficient amount of water to the reaction medium, when the level of polymerization reaches a certain level, e.g., 20%, thereby causing or requiring a dispersion of the unpolymerized monomer particles in the water. Such inversion polymerization has been developed and favored as it is capable of producing polymers with improved uniform characteristics such as porosity, size and structure.

It is, however, known that such an inversion process is often hampered by an excessive polymer buildup on the internal surfaces of the reactor, which often leads to the employment of radical means of removal such as a high pressure injection of water, solvent and various other types of reactor cleaners. Such cleaning process is not only costly due to the labor and the downtime of the reactor; but also presents serious potential health hazards.

Such polymer buildup problem has thus led the industry to search for effective methods of solving the problem. For instance, U.S. Pat. No. 4,117,216 ("'216 process") discloses the idea of coating the inner surface of the reactor with a water-soluble suspending agent. The methods disclosed in U.S. Pat. No. 4,182,808 ("'808 process") and U.S. Pat. No. 4,182,809 ("'809 process") attempt to further improve the '216 process by way of employing a dual coating system: namely, the use of monomer-soluble chemicals as the primary coating and the use of a water-soluble suspending agent as the top coating. Although the coating methods proposed in these patents reduce the level of polymer buildup, none of them is proven to be completely satisfactory. Furthermore, the '808 and '809 processes are rather cumbersome and impractical as they require an extra coating process and the presence of the residues of the oil-soluble coating agent or the primary coating in the final product is less desirable.

SUMMARY OF THE INVENTION

In accordance with the present invention, it has now been discovered that the use of a single coating system comprising a clay and a water-soluble suspending agent or hydrophilic polymer significantly improves the inversion polymerization of vinylchloride by way of substantially reducing the polymer buildup on the internal surfaces of the reactor and by way of producing the polymer having the desired size distribution, uniform porosity and shape.

The single coating system is comprised of an expanding latice clay, e.g., veegum, and a hydrophilic organic polymer, e.g., polyacrylic acid.

In another embodiment of the invention, the use of said expanding lattice clay and a hydrophilic polymer as the suspending agent in the present inversion polymerization process further entails an improved polymerization of vinylchloride.

Prior to the commencement of the polymerization process, the inner surfaces of the reactor are coated with the aforementioned mixture prepared by conventional methods.

DETAILED DESCRIPTION OF THE PREFERRED EMBODIMENTS

While the present invention is primarily directed to the inversion polymerization of vinylchloride, it may be applicable to the polymerization of such monomers as vinyl bromide, vinylidene chloride, vinyl acetate, acrylonitrile, etc. and mixtures thereof.

In carrying out the inversion polymerization of vinylchloride in accordance with the present invention, a batch reactor is initially coated with the mixture of an expanding lattice clay and a hydrophilic organic polymer. The expanding lattice clays amenable to the present invention include: montmorillonite, smectite, sucinite, vermiculite, nontronite, saponite, hectorite, etc., which have a three-layer crystal. These clays are commonly found in admixture in bentonite clays having an average aluminum oxide content less than about 20 percent. The bentonite clays also have a high ion exchange capacity commonly between about 50 and 150 miliequivalents per 100 grams of air-dried clay. Swelling or expanding lattice clays are found in such places as Wyoming, South Dakota, Montana, Utah, Nevada and California.

The afore-described clays are usually found in a form wherein the ion exchange sites are occupied with alkali and/or alkaline earth metals, e.g., sodium, potassium, calcium, magnesium, etc. The clays can be used in this form and are usually washed and ground to the desired degree of fineness.

Of the afore-mentioned expanding lattice clays, the preferred is veegum which is a complex colloidal magnesium aluminum silicate derived from natural smectite clay. The chemical composition of veegum is as follows:

TABLE 1

| Ingredient | Content |
| --- | --- |
| silicon dioxide | 56.9–69.0% |
| magnesium oxide | 2.9–13.0% |
| aluminum oxide | 8.9–17.0% |
| ferric oxide | 0.7–1.8% |
| calcium oxide | 1.1–2.0% |
| sodium oxide | 2.1–3.8% |
| potassium oxide | 0.2–1.0% |

The hydrophilic polymer which is used in combination with the afore-mentioned expanding lattice clay can be a cellulose ether such as carboxymethyl cellulose, hydroxyalkyl cellulose ethers such as hydroxymethyl cellulose, hydroxyethyl cellulose which are obtained by reacting alkali cellulose with the appropriate halide sulfate or epoxide. Hydroxypropylmethyl cellulose which is obtained by including propylene oxide and methylchloride to react with alkali cellulose can also be used as well as hydroxybutylmethyl cellulose, which is obtained by including 1,2-butylene oxide with methyl chloride in the reactor with the alkali cellulose.

In addition to the above, a suitable hydrophilic polymer includes polyacrylic acid and its co-polymers, cross-linked polyacrylic acid and its co-polymers with other monomers such as acrylamide, etc. Polyacrylic acid is preferred, and cross-linked polyacrylic acid is most preferred as the suspending agent to be used in combination with the clay.

Any of the hydrophilic polymers and the expanding lattice clays described above can be mixed by employing conventional methods, e.g., using heat and agitation when necessary, to prepare the aqueous coating solution. The mixing ratio between the hydrophilic polymer and the clay may be in the range between 9:1 and 1:9 by weight, preferably between 3:1 and 1:3, more preferably between 2:1 and 1:2. The weight concentration of the coating solution may be in the range between 0.05% and 10%, preferably in the range between 0.1% and 7% and more preferably in the range between 0.4% and 3%.

The aqueous coating solution is applied to the surface areas of the reactor by spraying or brushing; and the excess is drained from the reactor. Although it is not necessary to dry the coating before charging the reactor, care must be taken not to prematurely remove the coating by getting water directly in contact with the coated areas.

In the first stage of the polymerization where the monomer constitutes the continuous phase, the coating is insoluble in said phase and substantially prevents the buildup of polymer on the internal surfaces of the reactor. The monomer is polymerized normally in the presence of an initiator to a conversion of the monomer to its polymer of between about 1 and about 20 percent and preferably between about 5 and 15%, more preferably between 8% and 10%. In this first step or stage the monomers are polymerized in mass. However, a water-in-monomer dispersion may be employed, the monomer still being the continuous phase. In this case, about 0.2% by weight, based on the weight of the water, of a water-soluble suspending agent may be employed. The mixing of the monomer is normally carried out by employing at least about 0.01% by weight and preferably between about 0.1 and 1.0% by weight, based on the weight of the monomer, of a monomer-soluble dispersing agent, in the presence of a monomer-soluble polyermization initiator.

The polymerization is initiated by the thermal decomposition of the initiator to form free radicals which initiate and propagate the polymerization. The amount of initiator may be in the range between 0.01 and 2, preferably from 0.02 to 1.0%, based on the weight of the monomer in the polymerization reactor. A number of free radical precursors which are soluble in vinylchloride may be used as initiators. Examples of suitable initiators are: dibenzoyl peroxide, dicumyl peroxide, 2,2-azo(bis)isobutyronitrile, 2,2-azobis(dimethylvaleronitrile), diethyl peroxide, distearyl peroxide, t-butyl peroxide, di(2,4-dichlorobenzoyl)peroxide, diacetyl peroxide, t-butyl perbenzoate, t-amyl peroctoate, di(t-butyl peroxy)cyclohexane, di(t-butyl)peroxide, dicumyl peroxide, acetyl cyclohexyl sulfonyl peroxide, di(2-ethylhexyl)peroxydicarbonate, di(sec-butyl) peroxydicarbonate, diisopropyl peroxydicarbonate, t-butyl peroxypivalate, lauroyl peroxide, etc. Of the aforementioned, di(sec-butyl)peroxydicarbonate is a preferred initiator.

The polymerization is initiated by heating of the polymerization medium to a sufficient temperature to decompose the initiator and form free radicals. Commonly the polymerization is conducted in the temperature range from 25° C. to 100° C., preferably from 30° C. to about 60° C.

The monomer-soluble dispersing agents for use in the inversion polymerization process are the non-ionic surface active agents. Typical of such non-ionic surface active agents are the esters of fatty acids with glycerol, sorbitol and their polyoxyethylene derivatives. Examples of these esters are sorbitan monostearate, sorbitan tristearate, glycerol monopalmitate, sorbitan monooleate, poe(4)sorbitan monolaurate and poe(20)sorbitan monooleate.

In the second stage of the inversion polymerization process of the present invention, the water containing a suitable water-soluble suspending or dispersion agent is added to the water-in-monomer dispersion, or to the initially or partially mass polymerized monomer(s). The water solution can be added in any suitable manner. The water solution is added in such an amount as to give the desired concentration of monomer for final polymerization purposes, for instance, the amount of the water may be in the range between 100 and 800 weight %, based on the amount of the monomer present in the reactor, preferably between 150 and 500 weight %, more preferably between 100 and 200 weight %. This water-soluble suspending agent, which may be either identical or different from the water-soluble suspending agent employed in the formulation of the coating agent discussed above, can be can be selected from any of the hydrophilic organic polymers listed above; and may be employed in an amount between 0.01 and 10 weight % based on the amount of the water present in the reactor, preferably between 0.05 and 3 weight %, and more preferably between 0.15 and 2 weight %. As previously discussed, a mixture comprising an expanding lattice clay, e.g., veegum, and a hydrophilic organic polymer, e.g., polyacrylic acid, is one of the preferred suspending agents.

This second stage polymerization is conducted in a temperature ranging from 25° C. to 100° C., preferably from 30° C. to 80° C., and more preferably from 50° C. to 60° C.; and under the pressure ranging from 70 to 200 psig. The polymerization process continues until substantially entire amount of the monomer present in the reactor, e.g., 90%, is converted to the polymer. The polymer buildup which may have taken place during the first stage will be washed into the reaction medium when the water-soluble coating is dissolved. It has been found that the presence of the removed polymer buildup in the product mixture does not affect the quality of the finished polymer product. Any large size buildup particles would, in any event, be screened and separated.

What has been found most surprising and intriguing in the present invention is that, so long as the initial buildup of the polymer particles on the inner surfaces of the reactor is controlled by way of employing the coating agent of the instant invention, essentially no further polymer buildup occurs during the second phase of the polymerization process, thereby obviating the use of the so-called primary coating referred to in the '808 and '809 patents discussed above. This discovery together with other aspects of the present invention is further illustrated through the examples given below. In the examples, all parts and percentages expressed are based on weight unless otherwise indicated. All of the tests described in these examples were conducted in a 120 liter stainless steel jacketed batch reactor equipped with a 3-blade vertically curved turbine impeller, four baffles and other sensors; and about 70% of the reactor volume was filled with the materials participating in the polymerization reaction.

EXAMPLE 1

In this example, the inner surfaces of the reactor were coated with a mixture of a 0.22% aqueous solution of veegum and a 0.22% aqueous solution of polyacrylic acid and allowed to drain. The reaction was sealed and evacuated to 10 mmHg. Then 0.6 part of sorbitan monostearate and 0.02 part of a 50% solution of di-secondary butyl peroxydicarbonate in odorless mineral spirits, based on 100 parts of monomer, was charged to the reactor followed by an addition of 100 parts of vinyl chloride. 40 parts of dimineralized water containing a mixture of 0.01 part veegum, 0.02 part polyacrylic acid, 0.007 part hydroxylpropylmethyl cellulose and 0.012 part poe(20) sorbitan monooleate was charged with agitation in a manner to avoid direct contact with the wall. The reactor was heated to 58° C. at about 130 psig pressure. The first stage polymerization was continued with agitation for a period of one hour or to conversion rate of about 8%.

After the first stage, 160 parts of demineralized water containing a mixture of 0.04 part veegum, 0.08 part polyacrylic acid, 0.028 part hydroxylpropylmethyl cellulose, 0.048 part poe(20)sorbitan monooleate was metered into the reactor over a period of 45 minutes.

Thereafter, the polymerization reaction was continued with water being the continuous phase until the pressure in the reactor reached about 100 psig. This resulted in a total conversion of about 85%. The polymer was removed and dried in the usual manner. Upon removal of the polymer slurry, the inner surfaces of the reactor were examines and found to be essentially free of polymer buildup. The polymer so produced had large and uniform particle size and had high porosity as shown in the second column of Table 2.

EXAMPLE 2

In this example, the inner surfaces of the reactor were coated with a mixture of a 0.4% aqueous solution of veegum and a 0.4% aqueous solution of xanthan gum and allowed to drain. Polymerization of vinylchloride was then conducted in the reactor using the same recipe and the process described in EXAMPLE 1. Upon removal of the polymer or polymer slurry, the inner surfaces of the reactor were examined and found to be substantially free of polymer buildup. The data from this test are listed in the third column of Table 2.

EXAMPLE 3

In this example, the same procedure and recipe were followed throughout as in EXAMPLE 1 with the exception that a mixture of a 0.95% aqueous solution of hydroxypropylmethyl cellulose and a 0.95% aqueous solution of veegum was used as the coating agent. The data from this test are shown in the fourth column of Table 2.

EXAMPLE 4

In this example, the inner surfaces of the reactor were not coated. Polyvinylchloride was then made in the reactor using the same recipe and the process described in EXAMPLE 1. The data from this test are shown in the fifth column of Table 2.

EXAMPLE 5

This example is intended to show the suprising effect of the present of veegum in the coating agent by way of comparing the results from EXAMPLES 1 to 3 with the data from this example where no veegum was used in preparing the coating formula.

In this example, the inner surfaces of the reactor were coated with a 2% aqueous hydroxypropylmethyl cellulose and allowed to drain. The reactor was sealed and evacuated to 10 mmHg. Then 0.6 part of sorbitan monostearate and 0.02 part of a 50% solution of di-(sec-butyl) peroxydicarbonate in odorless mineral spirits, based on 100 parts of monomer, was charged to the reactor followed by an addition of 100 parts of vinylchloride. 40 parts of demineralized water containing 0.04 part of hydroxypropylmethyl cellulose was charged with agitation in a manner to avoid direct contact with the wall. The reactor was heated to 58° C. at about 130 psig pressure. The first stage polymerization was continued with agitation for a period of one hour or to a conversion of monomer to polymer of about 8%.

After the first stage, 160 parts of demineralized water containing 0.16 part of hydroxypropylmethyl cellulose was metered into the reactor over a period of 45 minutes. The data from this test are shown in the sixth column of Table 2.

EXAMPLE 6

This example is intended to show the beneficial effect stemming from the presence of, in the inversion polymerization medium, the mixture comrpising veegum and polyacrylic acid, by way of repeating the same reaction process under the like reaction conditions as in EXAMPLE 1, except that, in EXAMPLE 6, veegum was intentially removed from the reaction medium (although the coating containing veegum was employed). The test results are shown in the last column of Table 2.

TABLE 2( EXAMPLES 1-6 )

| | EXAMPLE NO. | | | | | |
|---|---|---|---|---|---|---|
| | 1 | 2 | 3 | 4 | 5 | 6 |
| Particle size(m) | | | | | | |
| 350 | 2.7% | 1.3% | 0.6% | 32.0% | 10.7% | 1.3% |
| 250 | 89.3 | 86.0 | 88.7 | 66.0 | 81.9 | 90.7 |
| 177 | 7.3 | 12.0 | 10.7 | 2.0 | 5.3 | 7.3 |
| 149 | 0.7 | 0.7 | | | 0.7 | 0.7 |
| 105 | | | | | 0.7 | |
| 105 | | | | | 0.7 | |
| Bulk density (g/cm) | 0.477 | 0.480 | 0.464 | 0.466 | 0.493 | 0.481 |
| Plasticizer sorption (parts/100 g resin) | 120.7 | 119.7 | 123.6 | 127.5 | 123.6 | 115.8 |
| K-value | 64.1 | 63.5 | 63.5 | 63.5 | 63.5 | 65.8 |
| Polymer Buildup(g) | 68.0 | 97.2 | 112.0 | 195.6 | 150.4 | 120.5 |
| Funnel flowtime (sec) | 1.6 | 1.9 | 1.9 | 1.8 | 3.4 | 1.9 |

What is claimed is:

1. In an improved process for the inversion polymerization of vinylchloride conducted in a reactor treated with a coating agent, the improved characterized by said coating agent comprising a complex colloidal magnesium aluminum silicate derived from smectite and a water-soluble suspending agent.

2. The process of claim 1 wherein said complex colloidal magnesium aluminum silicate has the composition of:
   (1) silicon dioxide from 56.9 to 69.0%;
   (2) magnesium oxide from 2.9 to 13.0%;
   (3) aluminum oxide from 8.9 to 17.0%;
   (4) ferric oxide from 0.7 to 1.8%;
   (5) calcium oxide from 1.1 to 2.0%;
   (6) sodium oxide from 2.1 to 3.8%; and
   (7) potassium oxide from 0.2 to 0.1%.

3. The process of claim 1 wherein said water-soluble suspending agent is polyacrylic acid.

4. The process of claim 1 wherein said water-soluble suspending agent is cross-linked polyacrylic acid.

5. The process of claim 4 wherein the improvement further comprises conducting said inversion polymerization in the presence of, as suspending agents, a mixture containing:
   (1) an expanding lattice clay; and
   (2) a hydrophilic polymer selected from the group consisting of carboxymethyl cellulose, hydroxymethyl cellulose, hydroxyethyl cellulose, hydroxypropylmethyl cellulose, hydroxybutylmethyl cellulose, xanthan gum polyacrylic acid, co-polymers of polyacrylic acid, cross-linked polyacrylic acid and co-polymers of cross-linked polyacrylic acid.

6. The process of claim 5 wherein said complex colloidal magnesium aluminum silicate has the composition of:
   (1) silicon dioxide from 56.9 to 69.0%
   (2) magnesium oxide from 2.9 to 13.0%;
   (3) aluminum oxide from 8.9 to 17.0%;
   (4) ferric oxide from 0.7 to 1.8%;
   (5) calcium oxide from 1.1 to 2.0%;
   (6) sodium oxide from 2.1 to 3.8%; and
   (7) potassium oxide from 0.2 to 1.0%.

7. The process of claim 5 wherein said hydrophilic polymer is polyacrylic acid.

8. The process of claim 5 wherein said hydrophilic polymer is cross-linked polyacrylic acid.

9. The process of claim 5 wherein said initiator is di(sec-butyl) peroxydicarbonate.

10. In an improved process for the inversion polymerization of vinylchloride conducted in a reactor treated with a coating agent, the improvement wherein said coating agent comprises:
    (1) a complex colloidal magnesium aluminum silicate derived from smectite; and
    (2) a hydrophilic polymer selected from the group consisting of carboxymethyl cellulose, hydroxymethyl cellulose, hydroxyethyl cellulose, hydroxypropylmethyl cellulose, hydroxybutylmethyl cellulose, xanthan gum polyacrylic acid, co-polymers of polyacrylic acid, cross-linked polyacrylic acid and copolymers of cross-linked polyacrylic acid.

11. The process of claim 10 wherein said complex colloidal magnesium aluminum silicate has the composition of:
    (1) silicon dioxide from 56.9 to 69.0%;
    (2) magnesium oxide from 2.9 to 13.0%;
    (3) aluminum oxide from 8.9 to 17.0%;
    (4) ferric oxide from 0.7 to 1.8%;
    (5) calcium oxide from 1.1 to 2.0%;
    (6) sodium oxide from 2.1 to 3.3%; and
    (7) potassium oxide from 0.2 to 1.0%.

12. The process of claim 10 wherein said hydrophilic polymer is polyacrylic acid.

13. The process of claim 10 wherein said hydrophilic polymer is cross-linked polyacrylic acid.

* * * * *